C. Rich,
Bed Bottom.
No. 111,974. Patented Feb. 21, 1871.

Witnesses:
Godfrey Mathys
Herm Lauten

Inventor:
Chas Rich

United States Patent Office.

CHARLES RICH, OF POUGHKEEPSIE, NEW YORK.

Letters Patent No. 111,974, dated February 21, 1871.

IMPROVEMENT IN SPRING BED-BOTTOMS, SEATS, &c.

The Schedule referred to in these Letters Patent and making part of the same.

*To all to whom it may concern:*

Be it known that I, CHARLES RICH, of Poughkeepsie, in the county of Dutchess and State of New York, have invented a new and useful Mode of Combining Springs for Spring-Beds, Seats, and Cushions; and I do hereby declare that the following is a full, clear, and exact description thereof, reference being had to the accompanying drawing making part of this specification, in which—

Figures 3, 4, 5, 6, and 7 are detail views of hooks, clasps, and linings of the same.

Like letters of reference indicate corresponding parts wherever they occur.

My invention consists in a combination of the following parts, to wit:

The several devices herein more fully described.

The following is a description that will enable others skilled in the art to make and use my invention.

In the accompanying drawing—

Figure 1:
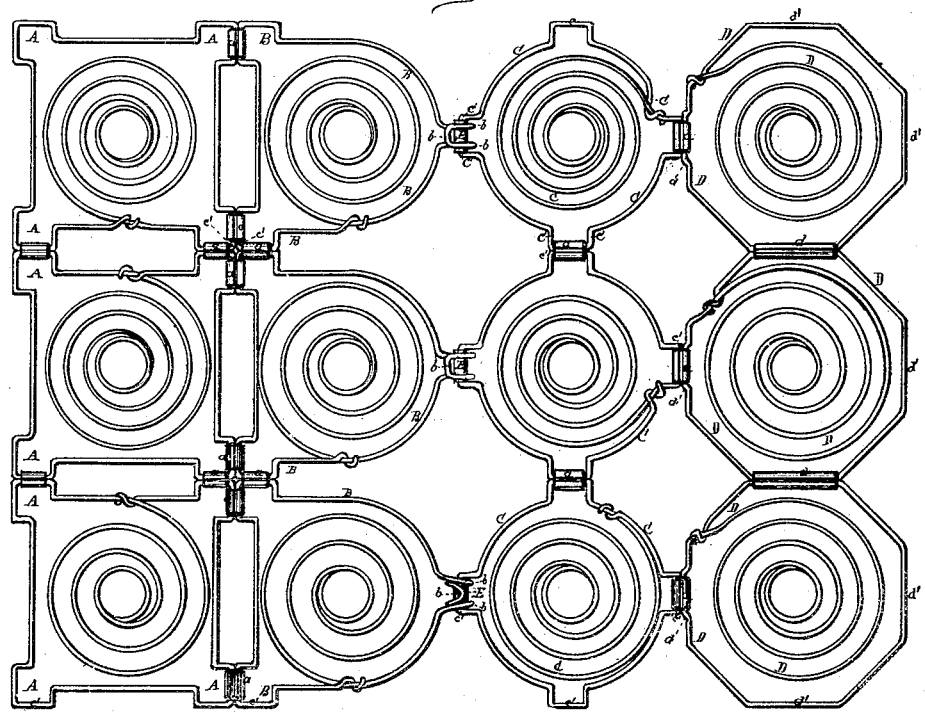
Figure 1 is a top view of twelve springs, showing my mode of combining them together.
Figure 2:
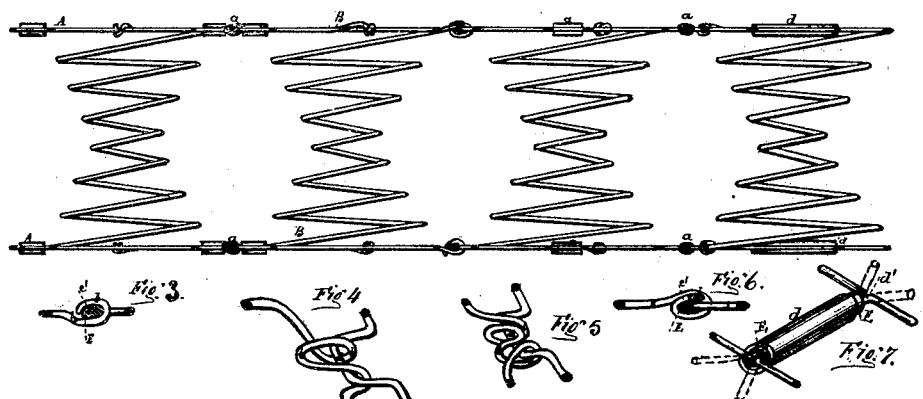
Figure 2 is a side elevation of the same.
Figure 2:
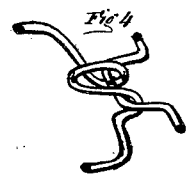
Figure 2:
Figure 2:
Figure 2:
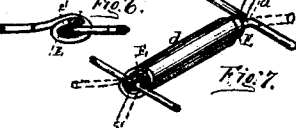

Fig. 1 represents sections of twelve helical springs, marked A B C D, connected together by means of sleeves or tubes, clasps and hooks, marked *a b d*, and bearings *c' d'*.

Some of these hooks or clasps are formed on the wire that composes the spring itself.

These tubes, clasps, and hooks are closed around the straight sides, or suitable shapes formed upon the adjoining springs, for receiving them, securing the wire of two springs in pairs together in four places equidistant from each other, when required; these tubes, clasps, or hooks I line or pack inside with a suitable material for preventing noise or creaking sounds, said lining marked E.

This lining may be composed of several kinds of metal, as tin, or tin and zinc, or other metallic compounds, or of leather or other yielding substance.

It is immaterial as to the form or shape which is made upon the coils of the springs for connecting them together, and as to the shape or length of the tubes, clasps, or hooks used for attaching them, provided they are suited to the forms upon the springs made to receive them, the main object being to secure the springs firmly together in such a manner that the connections shall form rolling joints and allow the structure to be rolled or folded up into compact form for storage or handling.

I prefer for this combination the springs marked C, patented by me August 30, 1870, and the clasps marked *a*, patented by me May 10, 1870; yet many other forms of springs will do with suitable clasps, tubes, or hooks properly packed, or lined and connected, as shown and described.

Spiral springs for bed-bottoms, upholstery, &c., have been made of varied forms, and many different shapes given to their terminal coils. Eyes, loops, and acute angles have been made for securing lacings by means of cords, tape, and webbing.

Straight sides of various lengths, with collars applied or attached at the ends of the straight sides or bends in the wire of the springs at the ends of the said straight sides, and straps and plates of metal applied to the straight sides between the angles or collars and to the angles of the springs in various ways for securing the springs together, as convex, concave, triangular, trapezium, octagonal, hexagonal, star, and diamond shapes, formed in the wire of the terminal coils of the springs; and spring-bed bottoms have been made of some of the above-described springs so as to fold or roll up for easy handling. But for such purposes cords and straps have been used, as no metallic strips or rigid plates of metal would admit of rolling the springs together into compact form until the clasps invented by me, above referred to, with suitable lining inside the clasps or tubes, as shown.

I do not claim any particular form of springs alone, nor the simple idea of combining tubes, clasps, or hooks with spiral springs, but What I do claim, and desire to secure by Letters Patent, is—

The combination of spiral springs A B C D with tubes, clasps, or hooks *a b d*, with lining or packing E inside the tubes, clasps, or hooks, all susceptible of being rolled or folded up, as described.

CHARLES RICH.

Witnesses:
R. C. SOUTHWICK,
D. S. MALLORY,
HERM. LAUTEN,
GODFREY MATHYS.